(12) United States Patent
Dunstan

(10) Patent No.: US 6,556,142 B2
(45) Date of Patent: Apr. 29, 2003

(54) SYSTEM AND METHOD TO COMMUNICATE FLOW INFORMATION BETWEEN A SERVICE DISTRIBUTION LINE AND A DESTINATION POINT

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/960,540

(22) Filed: Sep. 20, 2001

(65) Prior Publication Data

US 2003/0052790 A1 Mar. 20, 2003

(51) Int. Cl.[7] ............................................. G08B 21/00
(52) U.S. Cl. ..................... 340/606; 340/602; 340/615; 340/870.02; 73/861.77; 73/861.79; 73/861.65; 73/861.02
(58) Field of Search ................................ 340/606, 602, 340/615, 870.02; 73/861.77, 861.79, 861.65, 861.02

(56) References Cited

U.S. PATENT DOCUMENTS

| | | | | |
|---|---|---|---|---|
| 4,213,119 A | * | 7/1980 | Ward et al. | 340/151 |
| 4,590,805 A | * | 5/1986 | Baird et al. | 73/861.87 |
| 4,918,995 A | * | 4/1990 | Pearman et al. | 73/861.02 |
| 5,574,229 A | * | 11/1996 | Castillo | 73/861.78 |
| 5,721,383 A | * | 2/1998 | Franklin et al. | 73/861.77 |
| 6,246,677 B1 | * | 6/2001 | Nap et al. | 370/346 |
| 6,286,596 B1 | * | 9/2001 | Schnatzmeyer et al. | 166/250.15 |

* cited by examiner

Primary Examiner—Daniel J. Wu
Assistant Examiner—Tai T. Nguyen
(74) Attorney, Agent, or Firm—Kenyon & Kenyon

(57) ABSTRACT

A system and method for communicating information between a utility metering device, such as a water meter, and a remote location, such as inside a residence or a service provider.

30 Claims, 4 Drawing Sheets

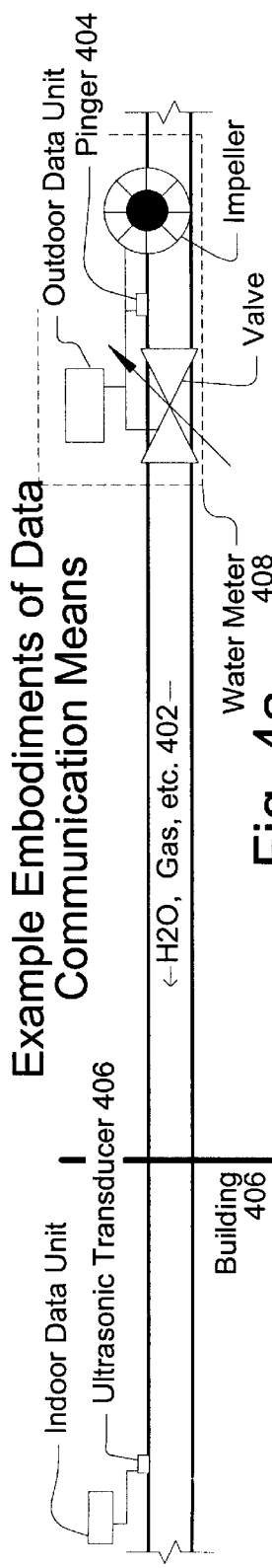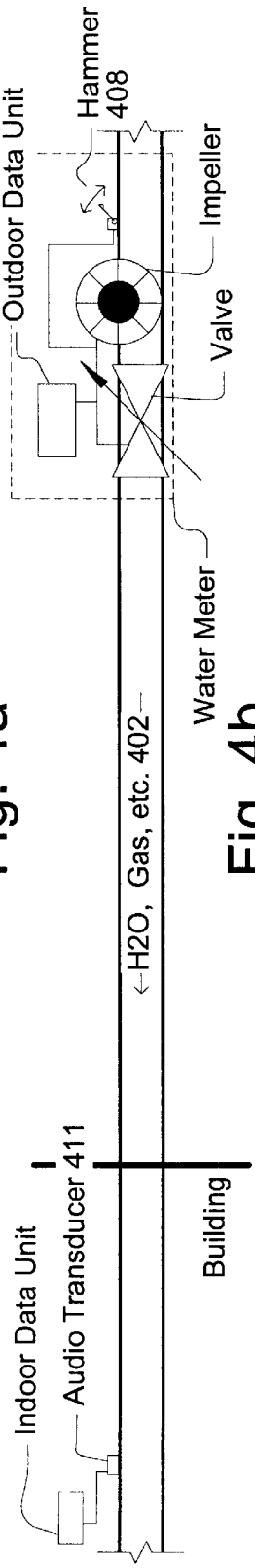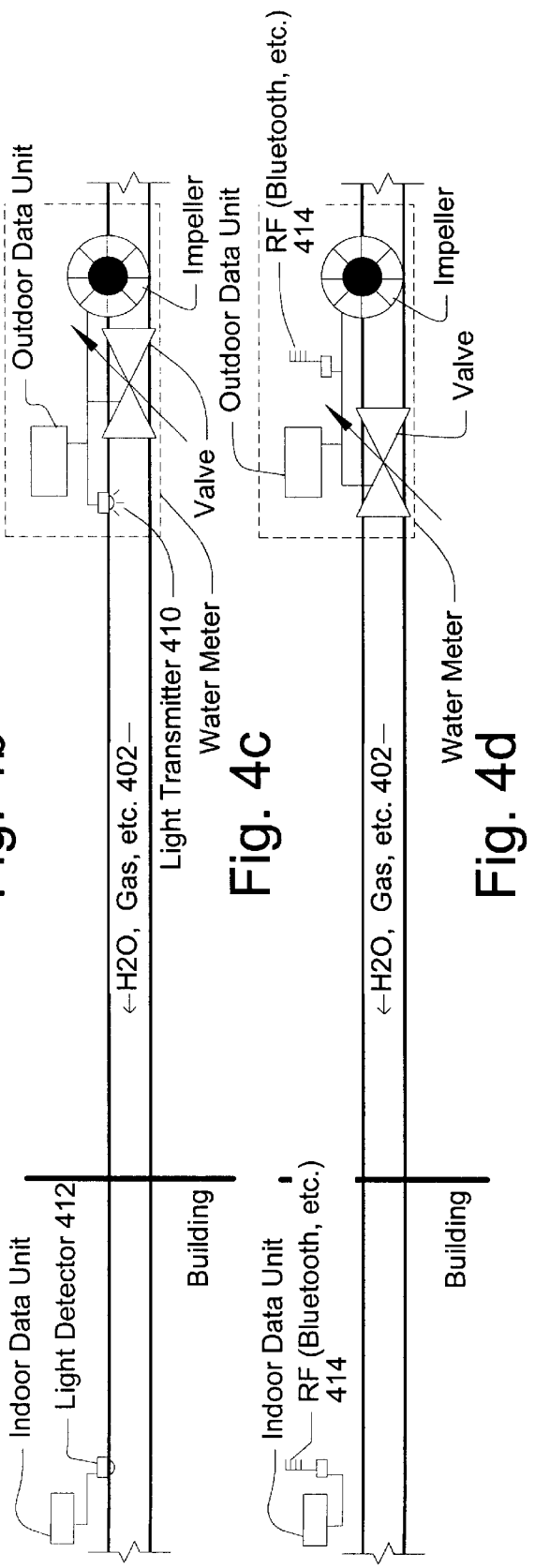

SYSTEM AND METHOD TO COMMUNICATE FLOW INFORMATION BETWEEN A SERVICE DISTRIBUTION LINE AND A DESTINATION POINT

BACKGROUND INFORMATION

The present invention relates to data communication. More specifically, the present invention relates to a system for communicating information between a utility metering device, such as a water meter, and a remote location, such as inside a residence or a service provider.

In the art today, utilities such as water and natural gas providers utilize mechanical devices affixed to the delivery pipe of each customer to determine individual usage. These devices typically use an impeller wheel of some kind in the path of the measured fluid to drive a calibrated, geared system for continually incrementing an analog display (e.g. values on a set of rotary dials) or digital display (e.g. a series of seven segment liquid crystals or light emitting diodes) of accumulated volumetric flow.

FIG. 1 provides an illustration of a conventional water meter 104 as used in the art today. A large diameter water main 102 is typically utilized to distribute water to several residential houses (or buildings) in an area. For billing purposes, it is necessary for the provider (in this case, the water company) to know how much water has been used during each billing period. To achieve this purpose, a water meter 104 is used. As stated above, an impeller 106 is often utilized as a component of the water meter 104. The flow of water 108 causes the impeller 106 to turn. The impeller 106 is directly linked to a geared system 110, which has been calibrated for volumetric accuracy, to provide a digital or analog display 112 of accumulated flow. The display 112 continually increments with each cubic volume (typically tenths or hundredths of a cubic foot) of water passing the water meter 104.

Because water and gas meters in the art today are isolated from the respective service providers, meter readers are necessarily hired to monitor the meter of each assigned building periodically. The information he/she collects is then used to calculate each customer's bill. Besides being susceptible to human error in data recordation, this process is very expensive and inefficient. Further, this system provides no means for the customer to monitor his/her own service usage in real time. Meter readings can be difficult to interpret and utilize by a customer if they are accessible for the customer to view at all. Further, with the current art, it is difficult for the service provider or the customer to recognize a continuous, low usage—a strong indicator of a leak.

It is therefore desirable to have a system for communicating information between a utility metering device and a remote location to prevent the above-mentioned problems, as well as for other benefits.

BRIEF DESCRIPTION OF THE DRAWINGS

FIG. 4a illustrates the utilization of ultrasonic transmission along the pipe under principles of the present invention.

FIG. 4b illustrates the usage of audible frequency-range sound transmission for communication between ends of the water pipe under principles of the present invention.

FIG. 4c illustrates a commnunication means utilizing a pulsing light source under principles of the present invention.

FIG. 4d illustrates the usage of a radio frequency (RF) transmission of the water meter flow information under principles of the present invention.

DETAILED DESCRIPTION

Figure 1:
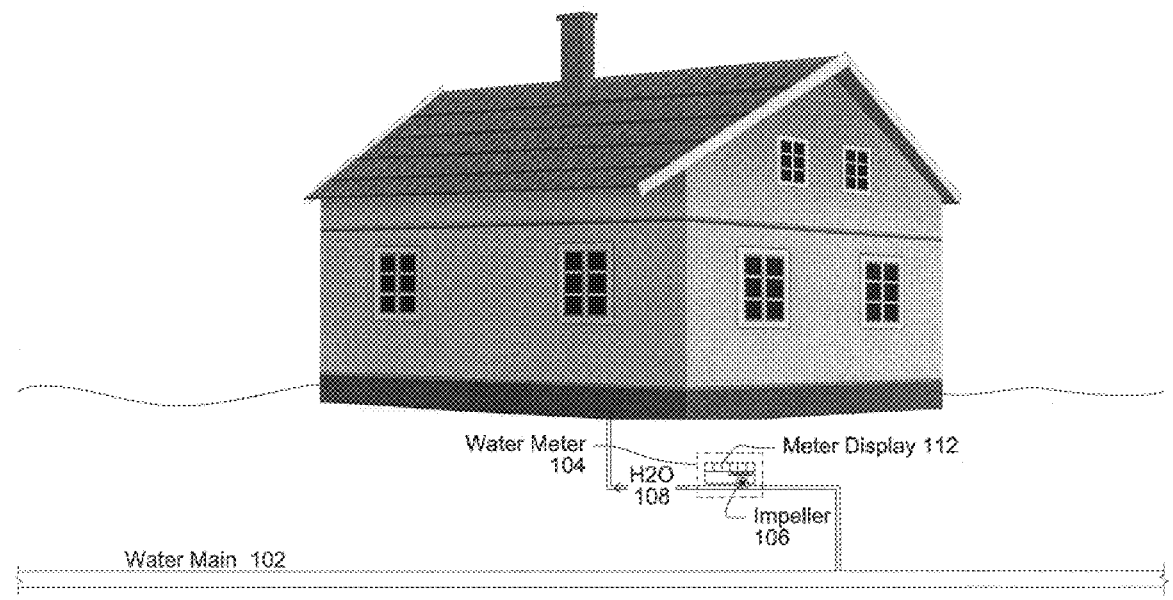
FIG. 1 provides an illustration of a conventional water meter as used in the art.
Figure 2:
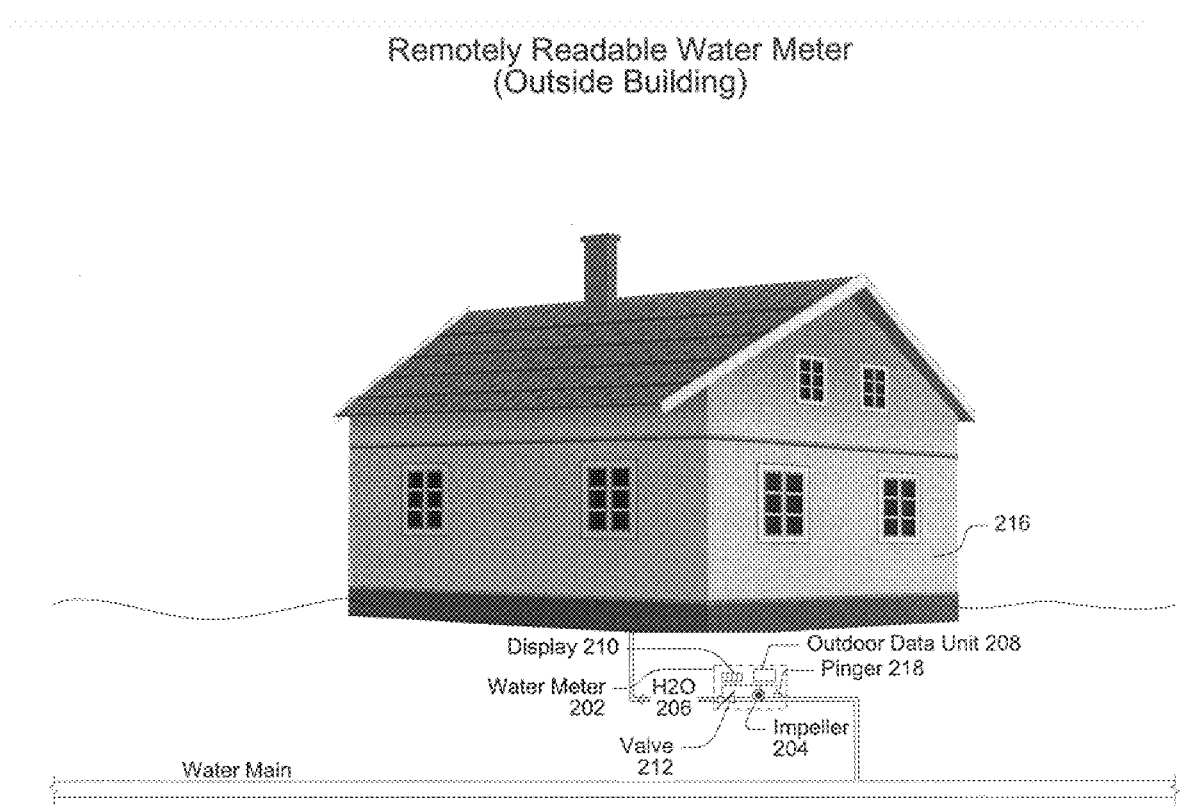
FIG. 2 provides an illustration of a remotely readable water meter under principles of the present invention.

FIG. 2 provides an illustration of a remotely readable meter under principles of the present invention. A meter 202, such as a water or gas meter, is attached to a medium, such as the local delivery pipe 214, in a configuration similar to existing meters from a service distribution line to a destination point, such as the inside of the house 216. In one embodiment of the present invention, an impeller 204 is caused to turn by the flow of the metered substance (e.g. water) 206 directed through its blades. In one embodiment, an electronic data unit 208 monitors the rotation of the impeller and calculates a volumetric flow rate of the water (or other substance). In one embodiment, the data unit 208 may also utilize memory (not shown) to calculate the total amount of water delivered from a certain point in time, e.g. the last billing period. Further, the data unit 208 may also calculate other statistics such as water delivery volume or flow rate between two specific points in history. As is stated below, in an alternate embodiment such calculations are performed remotely.

Further, in an embodiment, the water meter 202 provides an electronic display 210 to convey flow information to an operator. Also, in one embodiment, a solenoid-operated valve 212 attached in line of the water pipe 214 is controlled by the data unit 208. As explained below, in an embodiment, the valve 212 can be utilized by a homeowner to turn off his/her water (or gas, etc.) from inside his house (from his computer, etc.). Also, in one embodiment, a water company (or other service provider) may turn off (or increase or reduce) the water supply remotely for various possible reasons (e.g. a suspected water leak or to enforce water restrictions).

In one embodiment, the data unit causes an ultrasonic emitter (pinger) 218 to produce an ultrasonic signal inside the pipe 212. As explained below, in one embodiment the signal may be received by an ultrasonic transducer (receiver) at a different location (not shown) in the pipe span 214, such as inside the building 216. In an embodiment where a data unit 208 exists outside of the building 216, the pinger might provide an alternating signal for transmission of various information produced by the data unit (e.g. flow rate, volume, etc.). In another embodiment, where no external data unit 208 is utilized or where the data unit 208 does not perform any calculations and/or have memory, the pinger 218 would transmit a signal every time a specific number of revolutions of the impeller 204 has occurred. The calculations would occur remotely, utilizing these signals. In another embodiment, the impeller 204 recharges a battery or capacitor (not shown) running the meter's electronics in order to minimize necessary maintenance.

Figure 3:
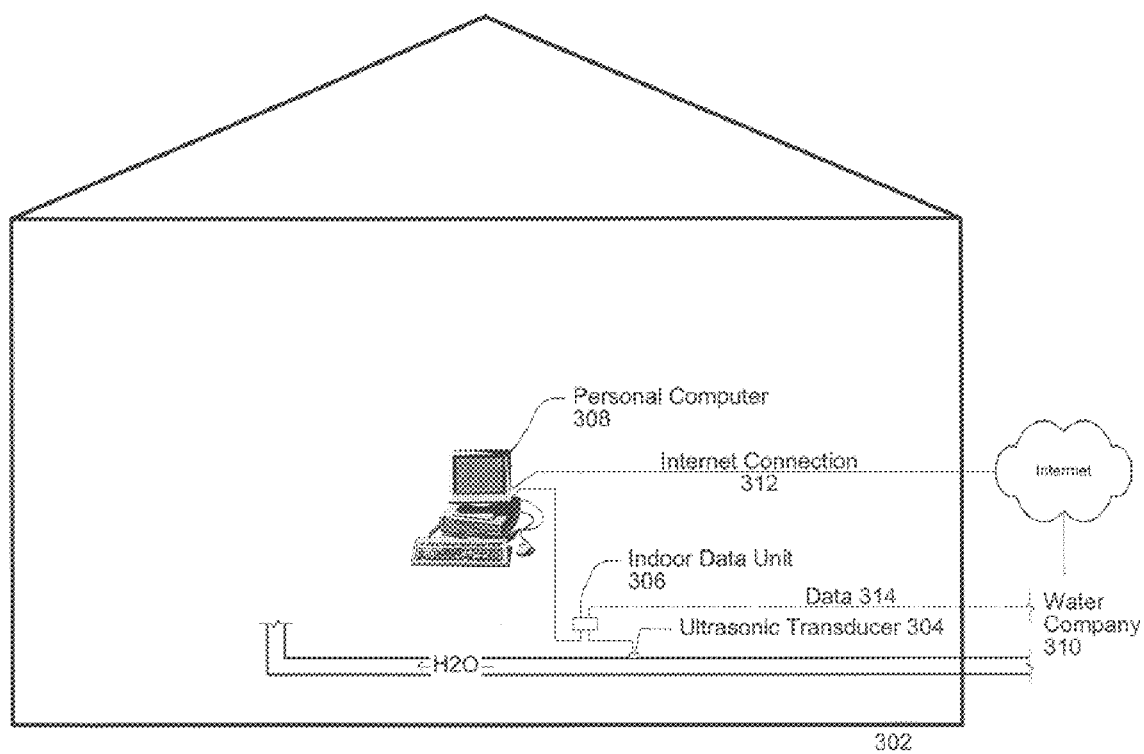
FIG. 3 provides an illustration of elements of the remotely readable water meter that exist inside the building under principles of the present invention.

FIG. 3 provides an illustration of elements of the remotely readable water meter that exist inside the building 302 under principles of the present invention. As explained above, in one embodiment of the present invention, an ultrasonic transducer (receiver) 306 is utilized to receive signals from the ultrasonic pinger 218 (See FIG. 2). As stated above, in one embodiment, these signals are representative of the number of revolutions of the impeller 204 (See FIG. 2). In an embodiment, this information is used by an indoor data unit 304 to calculate such things as current and/or past flow rates and/or flow volumes, as well as other flow-related statistical analysis. In one embodiment, the calculated information may be conveyed by an electronic display attached to the data unit 304. In addition to, or in the alternative, flow information may be communicated to a personal computer 308.

Further, in one embodiment, the personal computer 308 is capable of forwarding flow information to the water company 310 via the Internet (or a dedicated connection, etc.) 312. In an alternate embodiment, the flow information is communicated 314 to the water company 310 directly from the data unit 306. In one embodiment, the water company 310 may use this information to calculate a customer's bill or to determine if there's a potential water leak at a customer's residence. Also, this information may be used to determine compliance with water use restrictions such as seasonal 'no lawn watering' on certain days of the week. Further, the water company could institute different pricing for usage at different times of the day. A schedule may be utilized that is developed based on peak usage times of the area. This would help the water company 310 more readily balance supply and demand throughout all time periods.

In one embodiment, communication may occur in the opposite direction—back to the water meter. In one embodiment, near the receiving device (e.g. ultrasonic transducer 304) inside the building, there would also be a sending device (e.g. ultrasonic emitter), and near the sending device (e.g. ultrasonic emitter) outside the building, there would also be a receiving device (e.g. ultrasonic transducer). In one embodiment, if flow information is stored at an outdoor data unit 208 (See FIG. 2), the information can be accessed upon request. In another embodiment, the customer or the water company 310 can utilize the connection to the valve 212 (See FIG. 2) to open or close (or partially restrict) the flow of water from a remote location.

Further, with a personal computer 308 utilized, the customer may continuously monitor his/her own water usage in order to more effectively conserve. Also, it may be of great interest to a user to learn his/her usage patterns.

FIGS. 4a–4d illustrate some different envisioned embodiments for communication means along the local delivery pipe 402 under principles of the present invention. In FIG. 4a, the utilization of ultrasonic transmission along the pipe 402 under principles of the present invention is illustrated. As explained above, in one embodiment, an emitter (pinger) 404 produces an ultrasonic signal that is received by an ultrasonic receiver (transducer) 406 inside the building 406 down the pipe. As stated above, communication may occur in the opposite direction (back to the water meter 408) with the attachment of an additional pinger and an additional transducer at the reverse ends of the pipe (not shown).

FIG. 4b illustrates the usage of audible frequency-range sound transmission for communication between ends of the water pipe 402 under principles of the present invention. In one embodiment, an electric solenoid-actuated hammer device 408 hits a surface which is acoustically coupled to the water pipe 402. An alternate embodiment may include a mechanically actuated hammer device. In an embodiment, the sound created by this impact may be received by a microphone (audio transducer) 411 further down the pipe 402. As stated above, additional components may be added in a reverse configuration to provide reverse communication.

FIG. 4c provides a communication means utilizing a pulsing light source 410 under principles of the present invention. In one embodiment, a pulsing light 410 transmits a signal to the other end of the pipe by flashing a specific pattern. The light signal is received in one embodiment by a light detector further down the pipe 402.

FIG. 4d illustrates the usage of a radio frequency (RF) transmission of the water meter flow information under principles of the present invention. In one embodiment, an RF transmitter using a protocol, such as Bluetooth (Version 1.1, Feb. 22, 2001), forwards the flow information to an RF receiver 416 down the pipe 402.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system to communicate flow information between a service distribution line and a destination point, the system comprising:

a measuring device for measuring flow of a substance in a medium between a service distribution line and a destination point;

a first flow information communicator communicatively coupled to said flow measuring device, wherein said first flow information communicator is a modulated light source coupled to said medium; and a second flow information communicator, wherein said second flow information communicator is a light detector coupled to said medium; and the flow information is to be communicated between said first flow information communicator and said second flow information communicator.

2. The system of claim 1, wherein the flow measuring device includes an impeller.

3. The system of claim 1, further comprising:

a first data unit to store said flow information, communicatively coupled to said first flow information communicator.

4. The system of claim 1, further comprising:

a second data unit to store said flow information, communicatively coupled to said second flow information communicator.

5. The system of claim 1, further comprising:

a second data unit, communicatively coupled to said second flow information communicator, to communicate with a computer.

6. The system of claim 5, wherein the computer provides communication of the flow information to a remote provider via an Internet connection.

7. The system of claim 1, further comprising:

a second data unit, communicatively coupled to said second flow information communicator, to communicate with a remote utility service provider.

8. The system of claim 1, wherein said second flow information communicator is capable of communicating to said first flow information communicator.

9. The system of claim 8, wherein the medium is a pipe.

10. The system of claim 9, further comprising:

a first data unit to control a valve in said pipe.

11. The system of claim 10, wherein said valve in said pipe is controlled based on an instruction received by a second data unit.

12. A method to communicate flow information between a service distribution line and a destination point, the method comprising:

measuring, by a measuring device, flow of a substance in a medium between said service distribution line and said destination point;

communicatively coupling to said flow measuring device a first flow information communicator, said first flow information communicator being an ultrasound emitter coupled to said medium; and communicating said flow information between the first flow information communicator and a second flow information communicator, said second flow information communicator being an ultrasound receiver coupled to said medium.

13. The method of claim 12, further comprising:

storing said flow information by a first data unit communicatively coupled to said first flow information communicator.

14. The method of claim 12, further comprising:

storing said flow information by a second data unit communicatively coupled to said second flow information communicator.

15. The method of claim 12, further comprising:

communicating with a computer by a second data unit communicatively coupled to said second flow information communicator.

16. The method of claim 15, wherein the computer provides communication of the flow information to a remote provider via an Internet connection.

17. The method of claim 12, further comprising:

communicating with a remote utility service provider by a second data unit communicatively coupled to said second flow information communicator.

18. The method of claim 12, wherein said second flow information communicator is capable of communicating to said first flow information communicator.

19. The method of claim 18, wherein the flow information communicator and the first data unit are powered by an energy storage device that is re-charged by said flow measuring device.

20. The method of claim 19, further comprising:

a first data unit to control a valve in said medium based on instruction received by a second data unit.

21. A set of instructions residing in a storage medium, said set of instructions capable of being executed by a processor to implement a method of communicating flow information between a service distribution line and a destination point, the method comprising:

measuring, by a measuring device, flow of a substance in a medium between said service distribution line and said destination point;

communicatively coupling to said flow measuring device a first flow information communicator, said first flow information communicator being an ultrasound emitter coupled to said medium;

communicating said flow information between the first flow information communicator and a second flow information communicator, said second flow information communicator being an ultrasound receiver coupled to said medium;

storing said flow information by a second data unit communicatively coupled to said second flow information communicator; and communicating with a remote utility service provider by said second data unit.

22. The method of claim 21, wherein the computer provides communication of the flow information to a remote provider via an Internet connection.

23. A system to communicate flow information between a service distribution line and a destination point, the system comprising:

a measuring device for measuring flow of a substance in a medium between a service distribution line and a destination point;

a first flow information communicator communicatively coupled to said flow measuring device, wherein the first flow information communicator is a hammer device coupled to said medium; and a second flow information communicator, wherein the second flow information communicator is a sound detection device coupled to said medium; and the flow information is to be communicated between said first flow information communicator and said second flow information communicator.

24. The system of claim 23, wherein the flow measuring device includes an impeller and the medium is a pipe.

25. The system of claim 23, further comprising:

a second data unit, communicatively coupled to said second flow information communicator, to communicate with a remote utility service provider.

26. The system of claim 25, wherein the computer provides communication of the flow information to a remote provider via an Internet connection.

27. A method to communicate flow information between a service distribution line and a destination point, the method comprising:

measuring, by a measuring device, flow of a substance in a medium between said service distribution line and said destination point;

communicatively coupling to said flow measuring device a first flow information communicator, said first flow information communicator is a modulated light source coupled to said medium; and communicating said flow information between the first flow information communicator and a second flow information communicator, said second flow information communicator is a light detector coupled to said medium.

28. The method of claim 27, further comprising:

communicating with a remote utility service provider by a second data unit communicatively coupled to said second flow information communicator.

29. The method of claim 27, wherein said second flow information communicator is capable of communicating to said first flow information communicator.

30. The method of claim 27, wherein the flow information communicator and the first data unit are powered by an energy storage device that is re-charged by said flow measuring device.

* * * * *